United States Patent [19]

Madej

[11] 4,397,437
[45] Aug. 9, 1983

[54] BEAM CLAMP

[75] Inventor: Edward A. Madej, Verona, Pa.

[73] Assignee: Robroy Industries, Verona, Pa.

[21] Appl. No.: 170,794

[22] Filed: Jul. 21, 1980

[51] Int. Cl.³ .............................................. F16L 3/24
[52] U.S. Cl. ...................................... 248/72; 411/431
[58] Field of Search ....................... 248/72, 73, 71, 70, 248/74 R, 228; 411/429, 430, 431, 371, 372, 373, 374, 377; 339/89 R, 89 C, 89 M; 174/87; 220/3.8, 44 R; 285/390

[56] References Cited

U.S. PATENT DOCUMENTS

| | | | |
|---|---|---|---|
| 1,262,743 | 4/1918 | Bronson | 411/429 X |
| 1,319,652 | 10/1919 | Korns | 248/72 |
| 1,516,911 | 11/1924 | Canfield et al. | 285/390 |
| 2,795,144 | 6/1957 | Morse | 411/431 X |
| 3,075,038 | 1/1963 | Schinske | 174/87 |
| 3,297,816 | 1/1967 | Waddington | 174/87 |
| 3,299,766 | 1/1967 | Gould et al. | 411/371 |
| 3,448,223 | 6/1969 | Thorsman | 174/87 |
| 3,724,706 | 4/1973 | Slocum | 220/38 |
| 4,180,228 | 12/1979 | Snyder et al. | 248/74 R |

FOREIGN PATENT DOCUMENTS

| | | | |
|---|---|---|---|
| 905344 | 7/1972 | Canada | 411/431 |
| 2516013 | 12/1975 | Fed. Rep. of Germany | 411/429 |

OTHER PUBLICATIONS

Electrical Construction and Maintenance–vol. 76, No. 1, Jan. 1977, p. 112.

Primary Examiner—William H. Schultz
Assistant Examiner—Ramon O. Ramirez
Attorney, Agent, or Firm—Stanley J. Price, Jr.; John M. Adams

[57] ABSTRACT

A threaded U-bolt receives a conduit to be clamped to an I-beam. A moisture resistant, polymeric material covers the conduit support portion of the U-bolt with the bolt threads remaining exposed. A clamping member covered with a moisture, resistant polymeric coating includes a first end portion adapted to engage a flange of the I-beam and a second end portion adapted to engage the conduit. A pair of apertures extend through the clamping member. A pair of resilient polymeric annular flanges extend upwardly from the upper surface of the clamping member and around the apertures. The U-bolt threaded ends extend upwardly through the apertures. A pair of polymeric nuts engage the threaded ends above the annular flanges of the clamping member. A resilient sealing flange extends radially from the open end of each encapsulated nut. The nuts are threadedly advanced on the U-bolt threaded ends to position the sealing flanges in contact with the clamping member annular flanges to form a radial, moisture resistant seal around the connections of the nuts to the threaded ends to prevent corrosion of the threaded connections.

16 Claims, 14 Drawing Figures

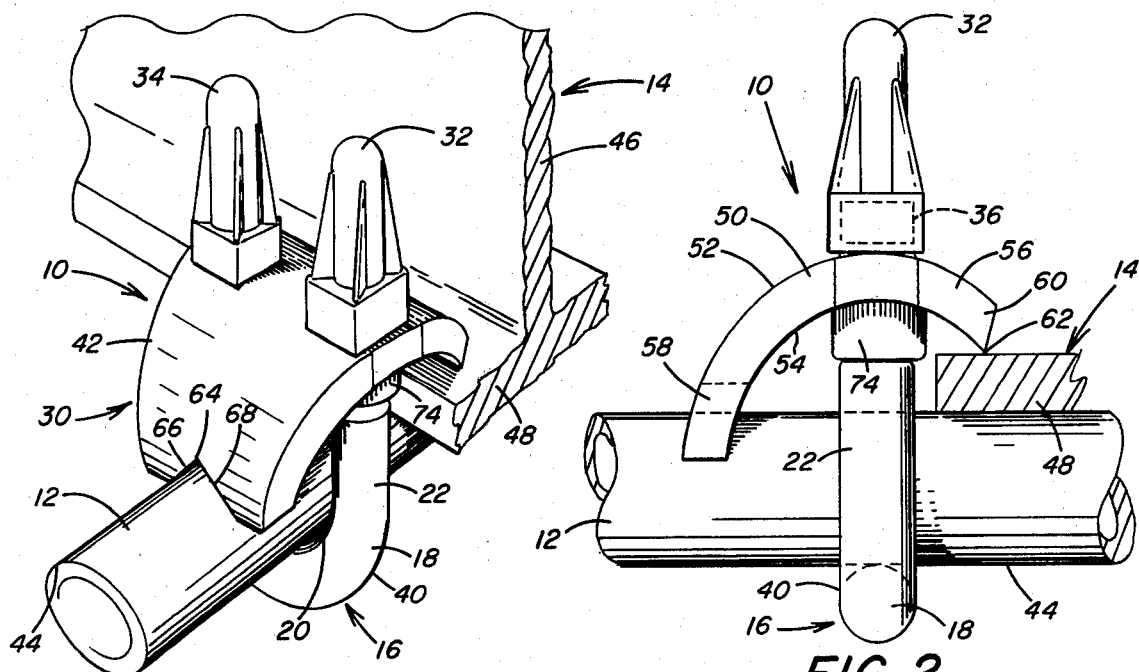

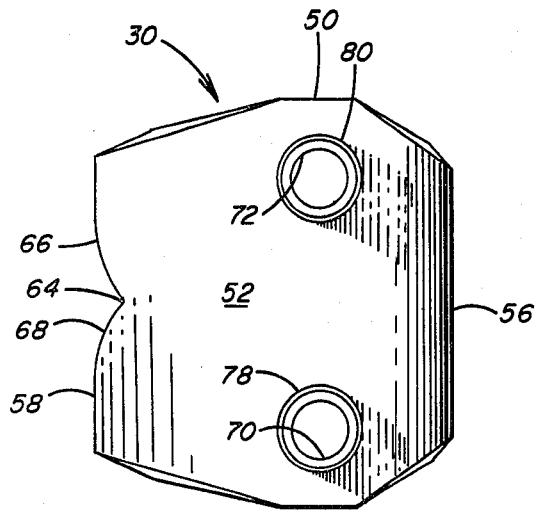
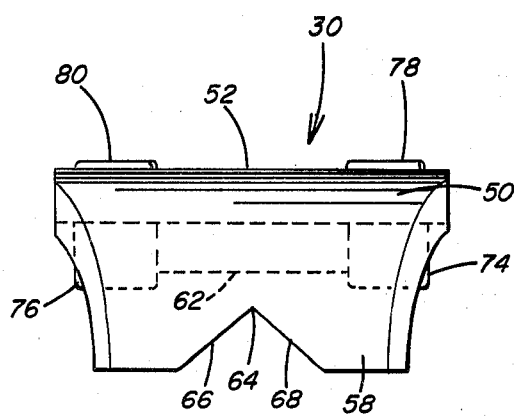
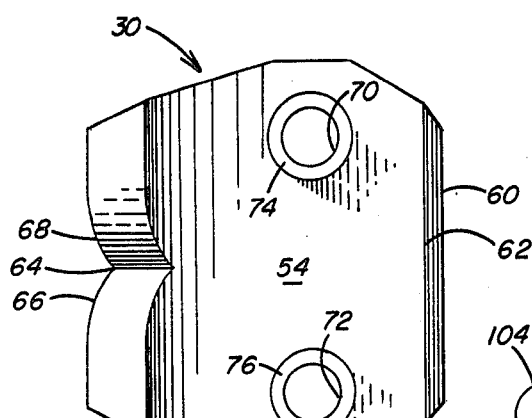
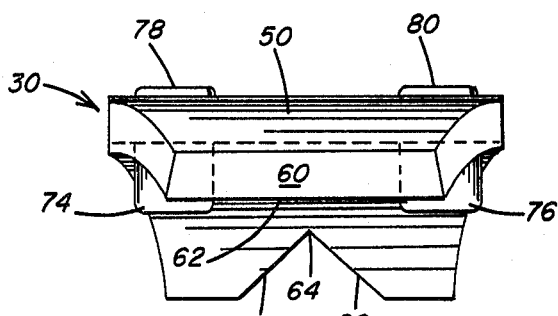
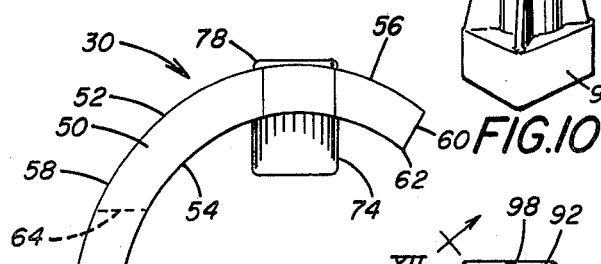
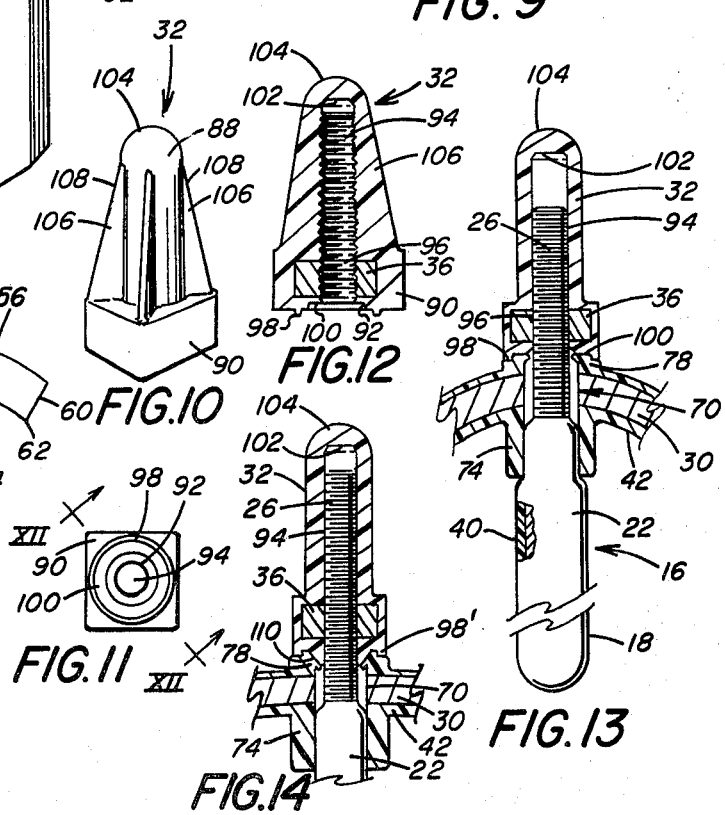

BEAM CLAMP

BACKGROUND OF THE INVENTION

1. Field of the Invention

This invention relates to apparatus for supporting a conduit from a beam and more particularly to a beam clamp coated with a moisture, resistant polymeric material in which a clamping member is secured to a U-bolt that supports a conduit adjacent to the beam with polymeric encapsulated nuts engaging the threads of the U-bolt is sealed relation to prevent corrosion of the threaded connection.

2. Description of the Prior Art

Beam clamps are well known in the art of securing a conduit, pipe, or the like in a preselected position to a structural member, such as an I-beam. A variety of types of beam clamps are known to position the conduit either vertically, parallel, or on edge relative to the longitudinally extending horizontal flange of the I-beam. U.S. Pat. No. 2,338,006 is an example of a clamp device releasably engageable with the vertical edge of a supporting structure to position the conduit in spaced parallel relation to the supporting structure. This type of clamp employs a threaded member for securing a U-shaped strap by a clip to the wall of the supporting structure. The clip is secured to the supporting structure by the threaded connection of a bolt and nut. The nut engages the threaded portion of the bolt that extends through the supporting structure.

One of the disadvantages of this type of arrangement is that threaded connections are subject to corrosive damage when employed in a corrosive environment. In many cases a beam clamp is located in a corrosive environment where moisture can easily enter the threaded connection of nuts and bolts. The corrosive damage can "freeze" the threaded connection. Consequently the beam clamp can become rendered useless by creating diffucult maintenance problems in disengaging the nut from the bolt to disassemble the clamp from the beam and the conduit.

It is also well known in the art as disclosed in U.S. Pat. Nos. 3,724,706; 3,784,236; and 3,799,584 to coat components of an assembly that must be capable of efficient assembly and disassembly in a corrosive environment with a moisture resistant, insulating, resilient, polymeric material, such as a polyvinylchloride (PVC). By providing male and female coupling members with a moisture, resistant polymeric coating a moisture resistant seal is formed around the otherwise exposed threads of the coupling members. In this manner moisture is prevented from entering the point of engagement, for example, of a nut on a threaded bolt to prevent freezing of the nut on the bolt.

While it is known to coat the components of a beam clamp, i.e. the clamping member and the U-bolt, with a moisture resistant, polymeric coating, the threaded connection of the clamping member to the U-bolt is exposed. The components generally are assembled in the field where the nuts and bolts are exposed to the affects of moisture.

To resist the deleterious affects of moisture it is known to apply a moisture resistant, polymeric material by brush coating the exposed nuts and the U-bolt. However, a moisture resistant coating applied in the manner to the exposed threaded connections and fasteners in a corrosive environment has proved unsatisfactory in preventing corrosion. Brushing on a polymeric coating after installation will not deter the accummulated affects of the corrosive atmosphere prior to the application of the coating. Furthermore, if improper attention is given to the brushing application of polymeric material to the exposed threads and nuts, an insufficient coating thickness to prevent corrosion may result.

Therefore, there is need to provide for a beam clamp a connection of the clamping member and the conduit support member capable of preventing corrosive damage while permitting rapid assembly and disassembly of the beam clamp components.

SUMMARY OF THE INVENTION

In accordance with the present invention there is provided apparatus for supporting a conduit from a structural member that includes a conduit support having a body portion for receiving a conduit and a connecting portion extending from the body portion. A moisture resistant, polymeric coating is provided on the body portion. A clamping member is positioned on the conduit support connecting portion. The clamping member has a body portion with a first end portion adapted to engage a beam and a second end portion adapted to engage a conduit. At least one aperture extends through the clamping member. A moisture resistant, polymeric coating is provided on the clamping member. The clamping member coating forms a resilient, annular flange surrounding the aperture. The conduit support connecting portion extends through the aperture and the resilient annular flange. A fastening member is releasably engageable with the connecting portion to urge the clamping member first end portion into engagement with a structural member to draw a conduit into abutting relation with the structural member to secure the conduit thereto. A moisture resistant, polymeric coating encapsulating the fastening member and forms a resilient, annular sealing flange. The fastening member sealing flange contacts the clamping member annular flange to provide a moisture resistant seal around the connecting portion at the point where the connecting portion extends through the aperture of the clamping member.

Further in accordance with the present invention there is provided a corrosion resistant fastener that includes a fastening member having a body portion with a bore therethrough. A moisture resistant, polymeric coating encapsulates the fastening member. The polymeric coating forms a body portion of a preselected thickness around the fastening member. The coating body portion has an open end portion aligned with the fastening member bore and a closed end portion. The closed end portion is longitudinally spaced from the fastening member. An elongated passageway is aligned with the fastening member bore and extends from the open end portion through the fastening member bore to the closed end portion. A resilient sealing flange extends outwardly from the open portion and is operable to form a radial seal around the fastening member.

The fastening member is preferably a nut having a threaded bore. A pair of nuts threadedly engage the threaded legs of a U-bolt that forms the conduit support to secure the clamping member to the conduit support and engage the conduit to the I-beam. Each nut is encapsulated by a pressure molding process with a polymeric material, such as polyvinylchloride, (PVC). The PVC coating surrounding the nut forms a cap having an elongated body portion which is open at one end to receive the threaded U-bolt and closed at the opposite end portion. The annular sealing flange surrounds the cap open end portion.

With this arrangement, the fastening cap is threaded onto the U-bolt to contact the cap annular sealing flange with the annular resilient flange of the clamping member. This provides an effective moisture resistant, radial seal around the threaded connection of the nut to the U-bolt.

The passageway formed by the body portion of the polymeric material encapsulating the nut is threaded a sufficient length to receive the length of the U-bolt. Thus, none of the threaded portions of the U-bolt in the assembled beam clamp are exposed. The portion of the U-bolt below the clamping member is coated with the polymeric material. The threaded portions of the U-bolt extending above the clamping member are sealed within the polymeric encapsulated nuts. This prevents the nuts from becoming "frozen" on the U-bolt due to corrosion.

The polymeric cap encapsulating the nut in one embodiment includes the resilient sealing flange engaging the resilient annular flange of the clamping member in sealing relation with the aperture through the clamping member. In another embodiment, the resilient sealing flange in the configuration of a boss on the encapsulated nut extends into the aperture to sealingly engage the resilient annular flange of the clamping member. In both embodiments, the encapsulated nut sealingly engages the clamping member to prevent moisture from coming in contact with the connection of the encapsulated nut to the threads of the U-bolt.

Accordingly, the principal object of the present invention is to provide a clamp that includes connecting members coated with a moisture resistant, polymeric material that effectively seals the connecting members against the damaging affects of a corrosive environment.

Another object of the present invention is to provide a clamp having assembled components that are coated with a polymeric material prior to installation to permit rapid assembly and disassembly of the components by preventing moisture from corroding the points of engagement of the components after the clamp is assembled.

A further object of the present invention is to provide a nut encapsulated in a moisture resistant polymeric material and form a radial sealing flange operable to prevent exposure of the threads of the nut to moisture when the nut is installed on the U-bolt of a beam clamp in a corrosive environment.

These and other objects of the present invention will be more completely disclosed and described in the following specification, the accompanied drawings, and the apended claims.

BRIEF DESCRIPTION OF THE DRAWINGS

FIG. 1 is an isometric view of a beam clamp in accordance with the present invention for supporting a conduit relative to a beam by a clamp coated with a polymeric material to prevent corrosion of the connecting members.

FIG. 2 is a view inside elavation of the beam clamp shown in FIG. 1, illustrating a saddle-shaped clamping member for urging a conduit supported on a U-bolt into engagement with an I-beam by the threaded engagement of encapsulated nuts on the threads of the U-bolt.

FIG. 3 is an end view of the beam clamp shown in FIG. 2, illustrating a V-shaped groove on the end of the clamping member for receiving the conduit which is held by engagement of the clamping member and the U-bolt in contact with the I-beam.

FIG. 4 is a fragmentary exploded view of the beam clamp of the present invention, illustrating the encapsulated nuts, clamping member, and conduit support member coated with a moisture resistant, polymeric material to protect the threaded engagement of the nuts with the U-bolt against corrosion.

FIG. 5 is a top plan view of the saddle-shaped clamping member illustrating the annular, resilient polymeric flanges surrounding the apertures through the clamping member.

FIG. 6 is a bottom view of the clamping member, illustrating a resilient polymeric sleeve formed integrally with the polymeric coating on the clamping member.

FIG. 7 is a view in side elevation of the clamping member shown in FIGS. 5 and 6, illustrating one of the annular resilient flanges on the upper surface of the clamping member and one of the polymeric sleeves extending from the lower surface of the clamping member.

FIG. 8 is a rear view of the clamping member shown in FIGS. 5-7.

FIG. 9 is a front view of the clamping member shown in FIGS. 5-7.

FIG. 10 is an isometric view of the polymeric encapsulated nut for engaging a threaded end of the U-shaped conduit support of the beam clamp.

FIG. 11 is a bottom view of the polymeric encapsulated nut shown in FIG. 10, illustrating the annular, resilient sealing flange extending radially around the open end portion into the encapsulated nut.

FIG. 12 is a sectional view of the polymeric encapsulated nut taken along line XII—XII of FIG. 11, illustrating an internally threaded nut encapsulated within an elongated polymeric cap open at one end and closed at the opposite end.

FIG. 13 is a fragmentary view, partially in section of the threaded connection of the polymeric encapsulated nut with the threaded end of the U-bolt, illustrating one embodiment of the resilient, annular sealing flange that extends radially outwardly for engagement with the complimentary annular, resilient flange on the upper surface of the clamping member externally of the aperture.

FIG. 14 is a view similar to FIG. 13, illustrating a second embodiment of the encapsulated nut resilient, annular sealing flange that engages in sealing relation the complimentary annular resilient flange of the clamping member internally of the aperture.

DESCRIPTION OF THE PREFERRED EMBODIMENTS

Referring to the drawings and particularly to FIGS. 1-4, there is illustrated apparatus generally designated by the numeral 10 for supporting a conduit 12 from a structural member, such as an I-beam generally designated by the numeral 14. The apparatus 10 includes a conduit support generally designated by the numeral 16 that includes a U-shaped body portion 18 with a recess 20 for supporting the conduit 12 and a pair of leg portions 22 and 24 extending upwardly from the body portion 18. The leg portions 22 and 24 have threaded end portions 26 and 28 respectively.

The conduit support 16 is releasably engageable with a saddle-shaped arcuate clamping member generally designated by the numeral 30. The clamping member 30 is secured on the threaded ends 26 and 28 of the conduit support or U-bolt 16 by a pair of polymeric fastening caps 32 and 34. Conventional nuts 36 and 38 are encapsulated within the caps 32 and 34 and are illustrated in detail in FIGS. 12–14.

In accordance with the present invention, the polymeric fastening caps 32 and 34 are internally threaded for engagement with the threaded ends 26 and 28 of the U-bolt 16 on the surface of the clamping member 30 is a manner to provide an effective radial seal around the threaded connection of the caps 32 and 34 to the threaded ends 26 and 28. This prevents moisture from coming into contact with the respective threads and thereby prevents corrosion of the threaded connection of caps 32 and 34 to the U-bolt, conduit support 16.

Both the conduit support 16 and the clamping member 30 are provided with moisture resistant polymeric coatings 40 and 42 respectively. The coatings 40 and 42 preferably comprise a moisture proof, chemical resistant, impact resistant, polymeric composition. Most preferably, the coatings 40 and 42 comprise a polyvinylchloride coating (PVC), but equivalent compositions may be employed, for example, impact resistant nylon, polypropylene, polyurethane, or polyethylene coatings are suitable. The coatings 40 and 42 protect the conduit support 16 and the clamping member 30 from corrosive damage due to moisture.

The conduit 12 may also be provided with a polymeric coating 44 of the above type to resist the corrosive effects of moisture. The nuts 36 and 38 for engaging the U-bolt threaded ends 26 and 28 are encapsulated in a moisture resistant polymeric material. The polymeric material is applied around the nuts 36 and 38 by pressure molding to form the fastening caps 32 and 34. The fastening caps 32 and 34 facilitate assembly and disassembly of the clamping member 30 on the conduit support 16 to secure the conduit 12 to the I-beam 14.

The apparatus 10 of the present invention is readily adaptable for use as a right angle beam clamp. With this arrangement, the apparatus 10 positions and secures the conduit 12 at a right angle with respect to the I-beam 14. As illustrated in FIG. 1, the I-beam 14 is conventional in design and includes a vertically extending web portion 46 integrally connected to a pair of horizontal flanges 48 (only of which is shown in FIG. 1). As will be explained later in greater detail, the conduit 12 is positioned at a right angle and in abutting relation with the lower surface of the flange portion 48 by gripping engagement of the clamping member 30 on the opposite upper surface of the flange portion 48.

The saddle-shaped clamping member 30, as seen in greater detail in FIGS. 5–9, includes an arcuately shaped body portion 50, having a convex upper surface 52 and a concave lower surface 54. The body portion 50, in turn, includes a first end 56 that is adapted to engage the beam flange portion 48 and an opposite second end 58 that is adapted to engage the polymeric coating 44 on the conduit 12. The first end 56 is provided with a transversely extending shoulder 60 having a gripping edge 62. The gripping edge 62 is operable to frictionally engage the upper surface of the I-beam flange portion 48. The clamping member body portion 50 curves downwardly from the first end portion 56 to the second end portion 58 which is positioned at an elevation, as seen in FIG. 7, below the first end portion of 56.

As illustrated in FIGS. 4–6 and 8 and 9, the second end portion 58 is provided with a V-shaped groove 64. The groove 64 forms a pair of inclined surfaces 66 and 68 that are suitably shaped to receive the surface of the conduit 12. The second end portion 58 of the clamping member 30, thus, securely seats or rides on the conduit 12 so as to stabilize the conduit 12 within the recess 20 of the conduit support, U-shaped body portion 18. The inclined surfaces 66 and 68 are provided with a suitable length so that the clamping member end portion 58 contacts a substantial surface area of the conduit 12.

As seen in FIG. 2, in the operative position when the clamping member 30 is connected to the conduit support U-bolt 16 by the fastening caps 32 and 34, the clamping member edge 62 engages the upper surface of beam flange 48. With the clamping member 30 securely mounted on the conduit 12 by engagement of the inclined surfaces 66 and 68 with the conduit 12, the portion of the conduit 12 below the beam flange 48 is urged into abutting relation with the lower surface of the flange 48. In this manner, the conduit 12 is securely clamped at a right angle to the I-beam 14.

In accordance with the present invention the polymeric coating 42 on the clamping member 30 is preformed by pressure molding of a moisture resistant, polymeric material on the metal substrate of the clamping member 30. A pair of transversely space apertures 70 and 72 extend through the body portion 50 substantially intermediate the ends 56 and 58, an illustrated in FIG. 4. In the process of molding the polymeric coating 42 on the metal substrate of the clamping member 30, integral resilient polymeric, annular sleeves 74 and 76 are formed on the polymeric coating 42 that is bonded to the metal substrate of the clamping member 30. The sleeves 74 and 76 extend downwardly from the concave surface 54 and radially surround the apertures 70 and 72.

Similarly, a pair of annular resilient flanges 78 and 80 are formed integrally with the polymeric coating 42 on the convex upper surface 52 of the clamping member 30. The resilient annular flanges 78 and 80 radially surround the respective apertures 70 and 72. The resilient annular flanges 78 and 80, as will be explained later in greater detail, form sealing surfaces engageable with sealing flanges at the open ends of the threaded caps 32 and 34. When the caps 32 and 34 are threadedly advanced onto the U-bolt threaded ends 26 and 28 as shown in FIGS. 1 and 2, this seal prevents moisture from coming into contact with the internal threads of the nuts 36 and 38 and the U-bolt threaded ends 26 and 28.

As illustrated in FIG. 4, the U-bolt body portion 18 is coated with a moisture resistant, polymeric material of the type described above for the coating 42 on the clamping member 30. The polymeric coating 40 on the U-bolt 16 surrounds the body portion 18 and the leg portions 22 and 24 that extend upwardly from the body portion 18. The threaded ends 26 and 28 of the U-bolt 16 are exposed. Preferably, the polymeric material is applied to the U-bolt 16 to form on the leg portions 22 and 24 a reduced diameter coating portion 82 and an enlarged diameter coating 84 portion. This forms a polymeric shoulder 86 separating the coating portions 82 and 84.

The polymeric coating portion 82 on the U-bolt legs 22 and 24 is operable to extend into the apertures 70 and 72 of the clamping member 30. The U-bolt legs 22 and 24 extend through the apertures 70 and 72 until the polymeric shoulders 86 abut the ends of the polymeric sleeves 74 and 76 on the clamping member 30, as illustrated in FIGS. 2 and 13. When the polymeric shoulders 86 abut the sleeves 74 and 76, further advancement of the legs 22 and 24 through the apertures 70 and 72 is prevented.

The coating portion 82 above the polymeric shoulder 86 extends a preselected length on each leg 22 and 24. This permits the shoulders 86 to be removed from contact with the sleeves 74 and 75 without exposing the threads. The amount of extension of the reduced diameter portion 82 from the sleeves 74 and 76 is determined by the thickness of the I-beam flange 48 to which the conduit 12 is clamped. Accordingly, the sleeves 74 and 76 are provided with a suitable length to surround the reduced portions 82 to prevent exposure of the threaded ends 26 and 28 below the sleeves 74 and 76. This permits the apparatus 10 to be clamped to a wide range of I-beam flange thicknesses.

Thus, for an I-beam having a thickness greater than that illustrated in FIG. 2, the shoulders 86 can extend below and be removed from contact with the sleeves 74 and 76 yet the threaded ends 26 and 28 are still retained within sleeves 74 and 76 and are not exposed. This feature of the present invention enhances the versatility of the beam clamp 10 for use with a wide variety of beam sizes without exposing the threaded ends 26 and 28 below the clamping member 30.

In operation to assemble the beam clamp 10 on the conduit 12 and to secure the conduit 12 to the beam flange 48, the conduit 12 is positioned in the recess 20 of the U-bolt 16. The leg portions 22 and 24 are extended through the sleeves 74 and 76, the apertures 70 and 72, and the resilient annular flanges 78 and 80. The clamping member 30 is positioned relative to the conduit 12 with the conduit 12 positioned in the groove 64. The gripping edge 62 of the clamping member 30 is positioned in abutting relation with the upper surface of the I-beam flange 48.

In this position even with the clamping member gripping edge 62 abutting the I-beam flange 48, the conduit 12 is still longitudinally movable through the U-bolt recess 20. Therefore, the fastening caps 32 and 34 must be advanced onto the bolt threaded end portions 26 and 28 to securely engage the clamping member 30 on the upper surface of I-beam flange portion 48 and the conduit 12 on the lower surface of the I-beam flange portion 48.

The molded polymeric material encapsulates the nuts 36 and 38 to form the caps 32 and 34 with a cylindrical elongated body portion 88 having a preselected material thickness as illustrated in FIGS. 12-14. FIGS. 10-12 are representative of each of the caps 32 and 34 illustrated in FIGS. 1-4. The representative cap 32 shown in FIG. 10 includes an enlarged base 90 formed integral with the cylindrical body portion 88 during the molding process. As illustrated in FIG. 11 the base has an opening 92 therethrough into an internally threaded passageway 94. The passageway 94 opposite the opening 92 is aligned with a threaded bore 96 of the repesentative nut 36 shown in FIG. 12. A resilient annular sealing flange 98 extends radially downwardly from the opening 92. The sealing flange 98 is operable to engage the complementary resilient annular flange 80 of the clamping member 30 to form a radial seal around the respective aperture through the clamping member 30. Extending radially inwardly from the annular sealing flange 98 to the passageway 94 of each cap 32 and 34 is an external sealing face 100. The sealing face 100 has a conical configuration that decreases in diameter from the annular sealing flange 98 radially inwardly to the passageway 94. The sealing face 100 is operable with the annular sealing flange 98 to contact the complementary clamping member resilient annular flange 80 to provide an effective moisture resistant seal around the respective threaded end of the U-bolt 16, as shown in FIG. 13.

The passageway 94 of each of the fastening caps 32 and 34 is threaded to provide an extension of the internal threads of the nuts 36 and 38. Preferably, the passageway 94 of each fastening cap 32 and 34 is threaded substantially along its entire length but may include a portion 102 at the end thereof which is not threaded. The end portion 102 of the passageway 94 closes the passageway 94 and provides a substantially semispherical closed end portion 104 of each fastening cap 32 and 34. By providing each cap 32 and 34 with a substantial length a wide range of lengths of U-bolt can be utilized with the present invention.

Another advantage of providing an elongation of the fastening caps 32 and 34 beyond the encapsulated nuts 32 and 34 is to prevent the threaded ends 26 and 28 of the U-bolt from penetrating and breaking through the closed end 104 of each cap 32 and 34. However, in view of the fact that each cap 32 and 34 is fabricated of a resilient material, in the event that the threaded ends 26 and 28 of the U-bolt should bottom in the respective cap the resilient nature of the polymeric material permits the caps 32 and 34 to elongate without breaking through the closed end 104.

As the fastening caps 32 and 34 are advanced downwardly on the U-bolt threaded ends 26 and 28, the cap annular sealing flanges 98 and the sealing faces 100 move into contact with the complementary sealing faces on the clamping member resilient annular flanges 78 and 80. The cap sealing flanges 98 and the clamping member annular flanges 78 and 80 first contact each other at the respective peripheries thereof. The area of sealing contact of sealing flanges 98 with the flanges 78 and 80 increases as the caps 32 and 34 are tightened on the U-bolt threaded ends 26 and 28.

Also due to the resilient nature of the complementary flanges 78, 80 and 98 as increased pressure is applied to the abutting flanges, the area of contact increases. By increasing the area of contact of the sealing flanges 98 with the complementary annular flanges 78 and 80 the more effective the seal around the apertures 70 and 72 to resist the entrance of moisture.

Once the fastening caps has been advanced on the respective threaded ends 26 and 28 to the point where substantial resistance to continued rotation of the caps 32 and 34 is encountered, an effective radial moisture resistant seal is formed around the threaded portions 26 and 28 of the U-bolt 16 and the internal threads of the encapsulated nuts 36 and 38. As illustrated in the embodiment in FIG. 13 it is the sealing engagement of the opposing polymeric surfaces of the fastening caps 32 and 34 and clamping member 30 which forms the moisture resisitant seal around the U-bolt threaded ends 26 and 28.

As seen in FIG. 13 the clamping member annular flange 78 when positioned in sealing engagement with the fastening cap sealing flange 98 is removed from contact with the threaded end 26. In fact, an annular space is provided between the inner radial edge of the annular flange 78 and the threads on the U-bolt 16. Thus to effect a moisture resistant seal around the U-bolt threaded ends 26 and 28 it is not necessary for the clamping member annular sealing flanges 78 and 80 to engage the threads of the U-bolt 16.

To facilitate the assembly and disassembly of the fastening caps 32 and 34 on the U-bolt threaded ends 26 and 28, each of the fastening caps 32 and 34 is provided with a plurality of lugs or stiffeners 106. The stiffeners 106 are formed integrally with the polymeric elongated body portion 88 and the base 90. Each of the lugs or stiffeners 106 extends substantially the length of the body portion 88 and includes an outer edge 108 that extends angularly from the closed end 104 outwardly to the base 90. Thus, the surface area of the lugs 106 increases progressively from the end portion 104 to the base 90.

The lugs 106 serve to reinforce the elongated cylindrical body portion 88 to prevent rupture of the body portion 88 upon turning the fastening cap. Also the combination of the elongated body portion 88 and the lugs 106 aid in turning the fastening cap onto the U-bolt threaded end. Not only do the lugs 106 serve to reinforce the body portion 88 but they also provide increased surface area for gripping the fastening cap in threading the fastening cap on and off of the respective U-bolt threaded end.

Now referring to FIG. 14 there is illustrated an alternate embodiment of the fastening cap resilient annular sealing flange 98'. In the embodiment of FIG. 13 the sealing flange 98 flares outwardly from the passageway 94; however, the sealing flange 98' in the FIG. 14 embodiment extends inwardly toward the passageway 94 to form a resilient radial seal boss 110 around the entrance into the fastening cap passageway 94 and the threaded bore of the encapsulated nut 36.

When the fastening cap 32 of the FIG. 14 embodiment is advanced into sealing engagement with the clamping member annular flange 78, the seal boss 110 moves into the respective aperture 70 to sealingly engage the annular flange 78. With the seal boss 110 extending inwardly from the base 90 of the fastening cap 32, when the seal boss 110 is in sealing engagement with the annular flange 78, the annular flange 78 is urged inwardly toward the U-bolt threaded end 26. This is to be compared with the arrangement in FIG. 13 where the outwardly extending annular sealing flange 98 encircles the annular flange 78.

However, it should be understood that in both embodiments, the annular sealing flange, 98' comes into contact in sealing relation with the annular flange 78 whereby a seal is formed between the polymeric coating surrounding the encapsulated nut 36 and the polymeric coating on the clamping member 30. Also with the configuration of the complementary resilient sealing flanges 78 and 98, 98' substantial sealing surfaces are provided.

The seal formed between the respective annular flanges 78 and 98, 98' is increased in sealing capability as the fastening cap is "tightened" securely onto the clamping member 30. Tightening the fastening caps 32 and 34 on the clamping member 30 securely engages the clamping member gripping edge 62 on the upper surface of the I-beam flange 48. However, it is not necessary to apply substantial torque to the fastening caps 32 and 34 in order to generate the required gripping engagement of the clamping member 30 with the upper surface of the I-beam flange portion 48 to securely urge the conduit 12 into abutting relation with the lower surface of the I-beam flange portion 48. Once the fastening caps 32 and 34 have been brought into sealing relation with the surface of the clamping member 30 where the flanges 78 and 80 are in sealing contact with the flanges 98, 98' the conduit 12 is securely clamped to the I-beam flange portion 48 and is restrained from longitudinal movement through the U-bolt recess 20.

According to the provisions of the patent statutes, I have explained the principle, preferred construction and mode of operation of my invention and have illustrated and described what I now consider its best embodiments. However, it should be understood, that within the scope of appended claims the invention may be practiced otherwise than as specifically illustrated and described.

I claim:

1. Apparatus for supporting a conduit from a structural member comprising, a conduit support having a body portion for receiving a conduit and a connecting portion extending from said body portion, a moisture resistant, polymeric coating on said body portion, a clamping member positioned on said conduit support connecting portion, said clamping member having a body portion with a first end adapted to engage a structural member and an opposite second end adapted to engage a conduit, at least one aperture extending through said clamping member, a moisture resistant, polymeric coating on said clamping member, said clamping member coating forming a resilient annular flange surrounding said aperture, said conduit support connecting portion extending through said aperture and said resilient annular flange, a fastening member releasably engageable with said connecting portion to urge said clamping member first end portion into engagement with a structural member to draw a conduit into abutting relation with the structural member to secure the conduit thereto, a moisture resistant, polymeric coating encapsulating said fastening member and forming a resilient, annular sealing flange, said resilient, annular sealing flange surrounding an opening into said fastening member, said conduit support connecting portion extending into said opening into engagement with said fastening member, a resilient seal boss extending radially inwardly from said resilient, annular sealing flange toward said opening, said resilient, annular sealing flange being urged into surrounding sealing relation with said clamping member annular flange so that said resilient seal boss extends into said aperture as said fastening member is tightened on said clamping member connecting portion and said resilient seal boss engages said clamping member annular flange to provide a moisture resistant seal around said connecting portion at the point where said connecting portion extends through said aperture of said clamping member.

2. Apparatus for supporting a conduit from a structural member as set forth in claim 1 which includes, said fastening member polymeric coating forming a cap around said fastening member, said cap having a closed end portion at one end and an opposite end portion surrounding said opening for passage to said connecting portion into engagement with said fastening member, and a sealing face flaring radially outwardly from said opening to said resilient annular sealing flange.

3. Apparatus for supporting a conduit from a structural member comprising, a conduit support having a body portion for receiving a conduit and a connecting portion extending from said body portion, a moisture resistant, polymeric coating on said body portion, a clamping member positioned on said conduit support connecting portion, said clamping member having a body portion with a first end adapted to engage a structural member and an opposite second end adapted to engage a conduit, at least one aperture extending through said clamping member, a moisture resistant, polymeric coating on said clamping member, said clamping member coating forming a resilient annular flange surrounding said aperture, said conduit support connecting portion extending through said aperture and said resilient annular flange, a fastening member releasably engageable with said connecting portion to urge said clamping member first end portion into engagement with a structural member to draw a conduit into abutting relation with the structural member to secure the conduit thereto, a moisture resistant, polymeric coating encapsulating said fastening member and forming a resilient, annular sealing flange, said resilient, annular sealing flange contacting said clamping member annular flange to provide a moisture resistant seal around said connecting portion at the point where said connecting portion extends through said aperture of said clamping member, said fastening member polymeric coating forming a cap around said fastening member, said cap having a closed end portion at one end and an opposite end portion with an opening therethrough for passage of said connecting portion into engagement with said fastening member, said resilient, annular sealing flange surrounding said opening, a sealing face flaring radially outwardly from said opening to said resilient annular sealing flange, said sealing face having a conical configuration decreasing in diameter from said resilient, annular sealing flange radially inwardly to said opening, and said sealing face being operable with said resilient, annular sealing flange to contact said clamping member annular flange in sealing relation to prevent exposure of said connecting portion and said fastening member to moisture.

4. Apparatus for supporting a conduit from a structural member comprising, a conduit support having a body portion for receiving a conduit and a connecting portion extending from said body portion, a moisture resistant, polymeric coating on said body portion, a clamping member positioned on said conduit support connecting portion, said clamping member having a body portion with a first end adapted to engage a structural member and an opposite second end adapted to engage a conduit, at least one aperture extending through said clamping member, a moisture resistant, polymeric coating on said clamping member, said clamping member coating forming a resilient annular flange surrounding said aperture, said conduit support connecting portion extending through said aperture and said resilient annular flange, a fastening member releasably engageable with said connecting portion to urge said clamping member first end portion into engagement with a structural member to draw a conduit into abutting relation with the structural member to secure the conduit thereto, a moisture resistant, polymeric coating encapsulating said fastening member and forming a resilient, annular sealing flange, said resilient, annular sealing flange contacting said clamping member annular flange to provide a moisture resistant seal around said connecting portion at the point where said connecting portion extends through said aperture of said clamping member, said fastening member polymeric coating forming a cap around said fastening member, said cap having a closed end portion at one end and an opposite end portion with an opening therethrough for the passage of said connecting portion into engagement with said fastening member, said resilient, annular sealing flange surrounding said opening, and a resilient seal boss extending radially inwardly from said resilient, annular sealing flange toward said opening.

5. Apparatus for supporting a conduit from a structural member as set forth in claim 1 in which, said clamping member body portion is arcuately shaped to form a convex upper surface and a concave lower surface, said resilient annular flange extending upwardly from said convex upper surface around said aperture, and said resilient annular sealing flange being compressed into sealing relation with said clamping member resilient annular flange on said convex upper surface as said fastening member is threadably advanced on said connecting portion into engagement with said convex upper surface.

6. Apparatus for supporting a conduit from a structural member as set forth in claim 1 in which, said clamping member body portion is arcuately shaped to form a convex upper surface and a concave lower surface, a resilient polymeric annular sleeve formed integrally with said polymeric coating on said claimping member on said concave lower surface, said resilient annular flange extending upwardly from said convex upper surface, and said resilient annular sleeve and said resilient annular flange being axially aligned and concentric with said aperture through said clamping member and said resilient annular sealing flange sealingly engaging said resilient annular flange.

7. Apparatus for supporting a conduit from a structural member as set forth in claim 1 in which,
said polymeric coating on said conduit support body portion terminating in a reduced diameter coating portion adjacent said connecting portion,
said connecting portion being exposed above said reduced diameter coating portion,
an enlarged diameter coating portion on said conduit support body portion spaced a preselected distance below said reduced diameter coating portion,
a polymeric shoulder separating said reduced diameter coating portion and said enlarged diameter coating portion,
said conduit support being adjustably positioned relative to said clamping member between a first position with said polymeric shoulder abutting said clamping member and a second position with said polymeric shoulder spaced from contact with said clamping member, and
said connecting portion being concealed within said aperture of said clampng member in said first and second positions.

8. Apparatus for supporting a conduit from a structural member as set forth in claim 1 in which,
said clamping member connecting portion being spaced from said resilient annular sealing flange sealingly engaged to said resilient annular flange to form around said connecting portion an annular space sealed to prevent the entrance of moisture therein.

9. A corrosion resistant fastener comprising,
a fastening member having a body portion with a bore therethrough,
a moisture resistant polymeric coating encapsulating said fastening member,
said polymeric coating forming a body portion of a preselected thickness around said fastening member,
said coating body portion having an open end portion aligned with said fastening member bore and a closed end portion,
said closed end portion being longitudinally spaced from said fastening member,
an elongated passageway aligned with said fastening member bore and extending from said open end portion through said fastening member bore to said closed end portion,
a resilient annular sealing flange extending outwardly from said coating body portion open end portion and operable to form a radial seal around said fastening member,
said coating body portion forming a cap around said fastening member,
said open end portion being positioned at one end of said cap and said closed end portion being positioned at the opposite end of said cap,
said fastening member being positioned closely adjacent to said open end portion, and
said cap including a sealing face flaring radially outwardly from said open end portion to said resilient annular sealing flange on said coating body portion.

10. A corrosion resistant fastener as set forth in claim 9 in which,
said sealing face has a conical configuration decreasing in diameter from said resilient annular sealing flange radially inwardly to said open end portion.

11. A corrosion resistant fastener comprising,
a fastener member having a body portion with a bore therethrough,
a moisture resistant polymeric coating encapsulating said fastening member,
said polymeric coating forming a body portion of a preselected thickness around said fastening member,
said coating body portion having an open end portion aligned with said fastening member bore and a closed end portion,
said closed end portion being longitudinally spaced from said fastening member,
an elongated passageway aligned with said fastening member bore and extending from said open end portion through said fastening member bore to said closed end portion,
a resilient annular sealing flange extending outwardly from said coating body portion open end portion and operable to form a radial seal around said fastening member,
said coating body portion forming a cap around said fastening member,
said open end portion being positioned at one end of said cap and said closed end portion being positioned at the opposite end of said cap,
said fastening member being positioned closely adjacent said open end portion, and
said cap including a resilient seal boss extending radially inwardly from said resilient annular sealing flange on said coating body portion toward said opening.

12. A corrosion resistant fastener as set forth in claim 9 which includes,
said coating body portion having a tubular configuration defined by said open end portion and said closed end portion with said passageway extending therebetween, and
said elongated passageway being internally threaded to receive a threaded member.

13. A corrosion resistant fastener as set forth in claim 9 which includes,
said fastening member bore being internally threaded, and
said elongated passageway being internally threaded to permit axial advancement of a threaded member through said elongated passageway into threaded connection with said fastening member bore.

14. A corrosion resistant fastener as set forth in claim 9 which includes
said coating body portion being resilient to permit elongation of said body portion from said closed end portion.

15. A corrosion resistant fastener as set forth in claim 9 which includes,
means extending longitudinally and externally on said coating body portion for facilitating the application of torque to said fastening member.

16. A corrosion resistant fastener as set forth in claim 9 which includes,
a base member formed integrally with and extending outwardly from said coating body portion,
said base member having a lower surface and an upper surface,
said resilient annular sealing flange formed integrally with and extending downwardly from said lower surface, and
stiffener means formed integrally with and extending upwardly from said upper surface to said closed end portion for strengthening said coating body portion to resist failure upon the application of torque to said coating body portion.

* * * * *